Dec. 30, 1930.   B. WITTKUHNS   1,787,225
ELECTROMAGNETIC COUPLING
Filed April 20, 1927
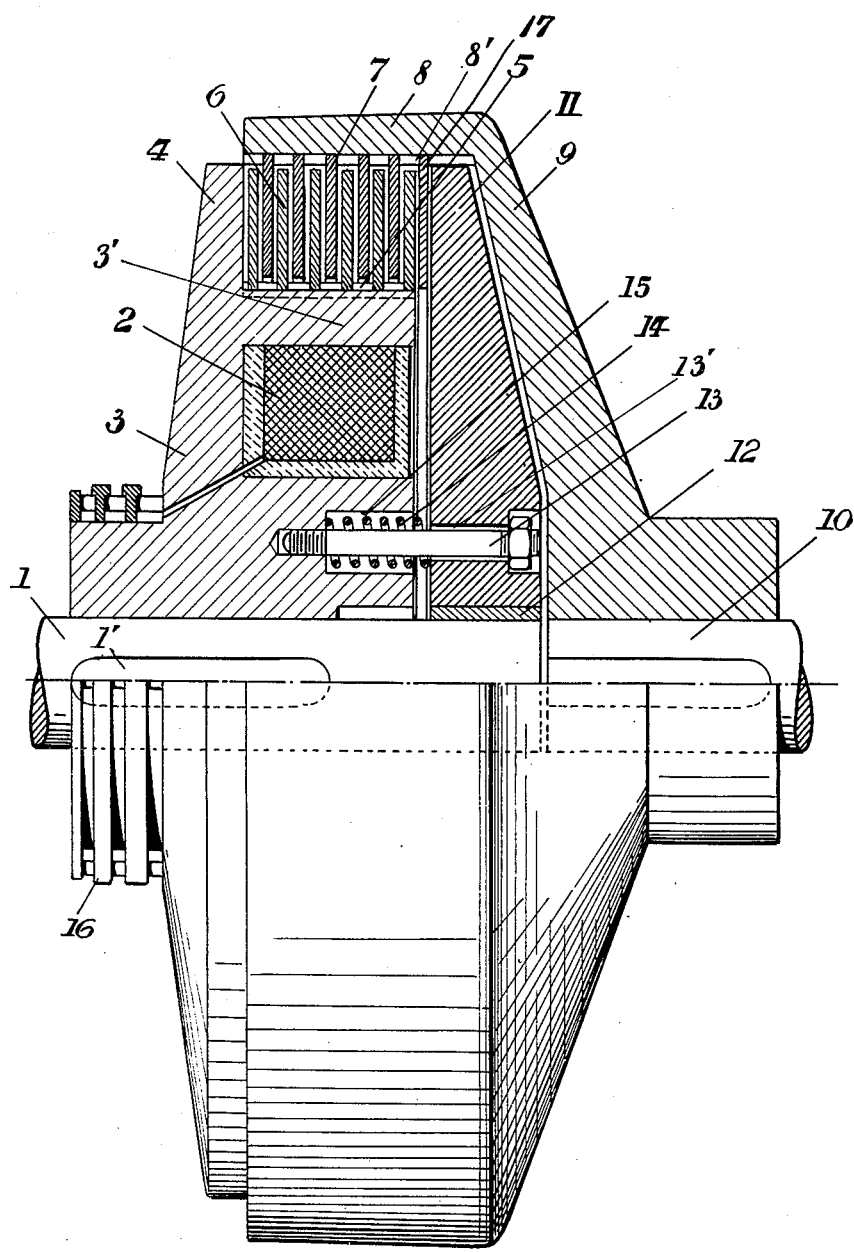
Inventor.
Bruno Wittkuhns,
By his Att'y,
Harold D. Penney Patented Dec. 30, 1930

1,787,225

UNITED STATES PATENT OFFICE

BRUNO WITTKUHNS, OF NEW YORK, N. Y., ASSIGNOR TO THE FIRM MAGNET-WERK G. M. B. H. EISENACH SPEZIALFABRIK FUR ELEKTROMAGNET-APPARATE, OF EISENACH, GERMANY

ELECTROMAGNETIC COUPLING

Application filed April 20, 1927, Serial No. 185,252, and in Germany May 20, 1926.

My invention relates to electromagnetically operated friction couplings or clutches, more particularly to the type of disk clutches in which the friction members consist of two sets of annular disks or rings which are so united with their corresponding clutch parts, that, while they are capable of a relative axial shift relative to each other, they cannot undergo relative rotative circumferential displacement. The friction elements of both groups are so coordinated axially that a friction member of one group alternates with a friction member of the other group.

In the usual clutches of this type, the coupling member is fixedly connected with one shaft and carries the exciting windings and thus forms the magnet body proper of the magnetic system of the clutch, in addition with its associated friction members. The armature or keeper coacting therewith is disposed inside the other coupling member which usually has the shape of a bell-shaped hollow housing and carries the other set of friction members and is fixedly united with the other shaft. In engaging clutches of this type through the switching on of the exciting current, the armature of the magnet body is attracted to the exciting windings and causes compression of the friction members. As a result the latter are caused to engage frictionally, and this causes one of the clutch members to be frictionally engaged to the other clutch member thereby establishing a driving coupling of the two shafts.

In order to cause instantaneous release and disengagement of the engaged friction members, when desired, it has heretofore been the custom in friction couplings of this type to provide thrust springs between the armature and the bell-shaped housing, whereby, as soon as the magnetic force is dissipated, the armature is forced away from the magnet body or core in the direction of the bell-shaped body with the result that the armature is released from the friction engagement. When re-engaging the clutch, these springs are tensioned again by action of the magnetic pull, and this tension, which is preserved during the entire period of magnetic engagement of the clutch, exercises a permanent load upon the other clutch member. This load or pull must be compensated by the use of special axial thrust bearings.

The aim and object of the present invention is to eliminate the foregoing outlined technical and structural faults and to this end the structure is so modified that the armature retraction springs, which tend to push the armature away from the magnet body are not arranged between the armature and its associated bell-shaped clutch member, but are located between the armature and the magnet body.

In an arrangement of this kind, these springs, of the compression type, produce no action at all upon the other clutch member. Their action occurs exclusively between the armature and the magnet body which, when the clutch is in the engaged position, constitute a single assembly or unit. Hence, transfer of axial traction or compression forces toward the assembly or closed system comprising the magnet body and the armature, is thus precluded, and distinct axial thrust bearings for the other clutch member or the shaft carrying or supporting the same are dispensable.

In the drawing the single figure there shown discloses, by way of example, a partially sectioned improved clutch, the upper half thereof being a vertical axial section, and the lower half in side elevation.

Upon the inner end of one of the shafts 1 to be coupled, there is fixedly keyed by a key, 1', the magnet body 3 carrying the exciting winding 2. The magnet body is provided in the usual manner outside of the magnet winding 2 with a disk-shaped shell 4 carrying a cylindrical flange 3', the outer face of which is furnished with a comparatively large number of longitudinal ribs 5. The said outer face carries one set of friction members consisting of annular disks 6. The inner edge of each disk is provided with recesses or notches corresponding to the ribs 5 of the body 3, the said disks being thus guided on the body 3 by the aid of said ribs 5 and the intervening recesses so that the disks are capable of movement in axial direction but not circumferentially with reference to the magnet body 3.

The friction members or annular disks 7 of the other group are carried by the cylindrical flange 8 of the second clutch member 9 carried by the other shaft 10. The inner side of the flange 8 is also furnished with ribs 8' extending in axial direction, the members 7 being guided by the aid of notches of convenient shape at the outer edge of the members and receiving the ribs.

The clutch member 9 has the form of a cup or bell being open at one end. In addition to the two sets of disks 6 and 7 and the major part of the magnet body 3, the clutch member 9 encloses the armature 11 which coacts in the usual manner with the magnet body 3. The armature 11 is of disk-like shape, and by the aid of a sleeve or bushing 12, is guided upon the shaft 1 in such a manner that it is capable of displacement in axial direction upon the shaft. Rotation of the armature 11 with reference to shaft 1 and consequently with reference to the magnet body 3 is prevented by a plurality of bolts 13 screwed into the latter, said bolts passing through countersunk bores 13' of armature 11 and being furnished with nuts at their extreme ends which serve as stops to limit movement of the armature 11 away from the body 3. The parts of the bolts 13 adjacent to the magnet body 3 are surrounded by coil springs 14 accommodated in suitable recesses 15 of the magnet body 3. The said springs bear with one of their ends against the bottoms of the bores 15, while at the other end they bear against the armature 11, and they thus tend to push the latter away from the magnet body.

When switching on the exciting current which is supplied to the winding 2 in the usual manner through slip rings 16, the armature 11, with incidental compression of springs 14, is attracted and forced against the packet of disks 6 and 7, by means of an annular washer 17 placed between the armature 11 and the first ring 6 with the result that the disks are caused to enter into frictional engagement with each other. Thus the coupling of parts 3 and 9 and thereby of the two shafts 1 and 10 is accomplished.

During the movement of the armature toward the magnet body 3, no pull or compression forces are exerted upon the clutch member 9. All of the motions occurring during the clutch initiating process, as well as such other kinetic actions as are associated therewith, occur exclusively inside the system comprising the magnet body 3 and the armature 11. The transmission of the torque occurs exclusively from the magnet body 3 through the two sets of disks 6, 7 to the bell-shaped body 9 and thence directly to the shaft 10.

I claim as my invention:

1. In combination, a pair of shafts; a cup-shaped clutch member on one shaft; an electromagnetic body mounted fast on the other shaft and received in said member and having a hub portion provided with inward opening shouldered longitudinal bores; friction members alternately secured to said body and clutch member respectively; a disk shaped armature in the clutch member between the clutch member and the magnet body and adapted, when attracted, to press the friction members together; said armature having bolt holes alined with said bores and having countersunk ends adjacent to the clutch member; bolts passed through said holes and bores and screwed into the magnet body; springs on said bolts compressed between the armature and the shoulders of the bores to press the armature from the magnet body; and nuts on the ends of the bolts in said countersunk ends to limit movement of the disk toward the clutch member.

2. The combination in a shaft clutch, comprising, with a pair of shafts, an enclosing clutch member on one shaft; an electromagnetic body on the other shaft; a plurality of superposed friction members; one group of said friction members being secured to said body, an alternate group of friction members secured to said enclosing clutch member; friction member pressing armature movably located between said enclosing clutch member and the magnet body and adapted to be attracted by said magnet body to close the friction members and means entirely enclosed within said enclosing clutch member for permitting the friction members to separate when the armature is released by the magnet body, said separating means acting immediately between said magnet body and said armature in opposite directions and upon the armature and the body only.

3. The combination in a shaft clutch, comprising, with a pair of shafts, an enclosing clutch member on one shaft; an electromagnetic body on the other shaft; a plurality of superposed friction members; one group of said friction members being secured to said body, an alternate group of friction members secured to said enclosing clutch member; a friction member pressing armature movably located between said enclosing clutch member and the magnet body and adapted to be attracted by said magnet body to close the friction members and resilient means entirely enclosed within said enclosing clutch member for permitting the friction members to separate when the armature is released by the magnet body, said resilient means acting immediately between said magnet body and said armature in opposite directions and upon the armature and the body only.

4. The combination in a shaft clutch, comprising, with a pair of shafts, an enclosing clutch member on one shaft; an electromagnetic body on the other shaft; a plurality of superposed friction members; one group of said friction members being secured to said body, an alternate group of friction members secured to said enclosing clutch member; a friction member pressing armature movably located between said enclosing clutch member and the magnet body and adapted to be attracted by said magnet body to close the friction members and resilient means between the magnet body and the armature and entirely enclosed within said enclosing clutch member for permitting the friction members to separate when the armature is released by the magnet body, said resilient means acting immediately between said magnet body and said armature in opposite directions and upon the armature and the body only.

5. The combination in a shaft clutch, comprising, with a pair of shafts, an enclosing clutch member on one shaft; an electromagnetic body on the other shaft; a plurality of superposed friction members; one group of said friction members being secured to said electromagnetic body, an alternate group of friction members being secured to said enclosing clutch member; a friction member pressing armature movably located between said enclosing clutch member and the magnet body and adapted to be attracted by said electromagnetic body to close the friction members, and a single set of uniform means coacting with said magnet body and said movable armature only, said means being without any immediate action upon said friction members and being entirely enclosed within said enclosing clutch member for permitting the friction members to separate when the armature is released by the magnet body.

Signed at New York, in the county of New York and State of New York, this 19th day of April A. D. 1927.

BRUNO WITTKUHNS.